United States Patent Office.

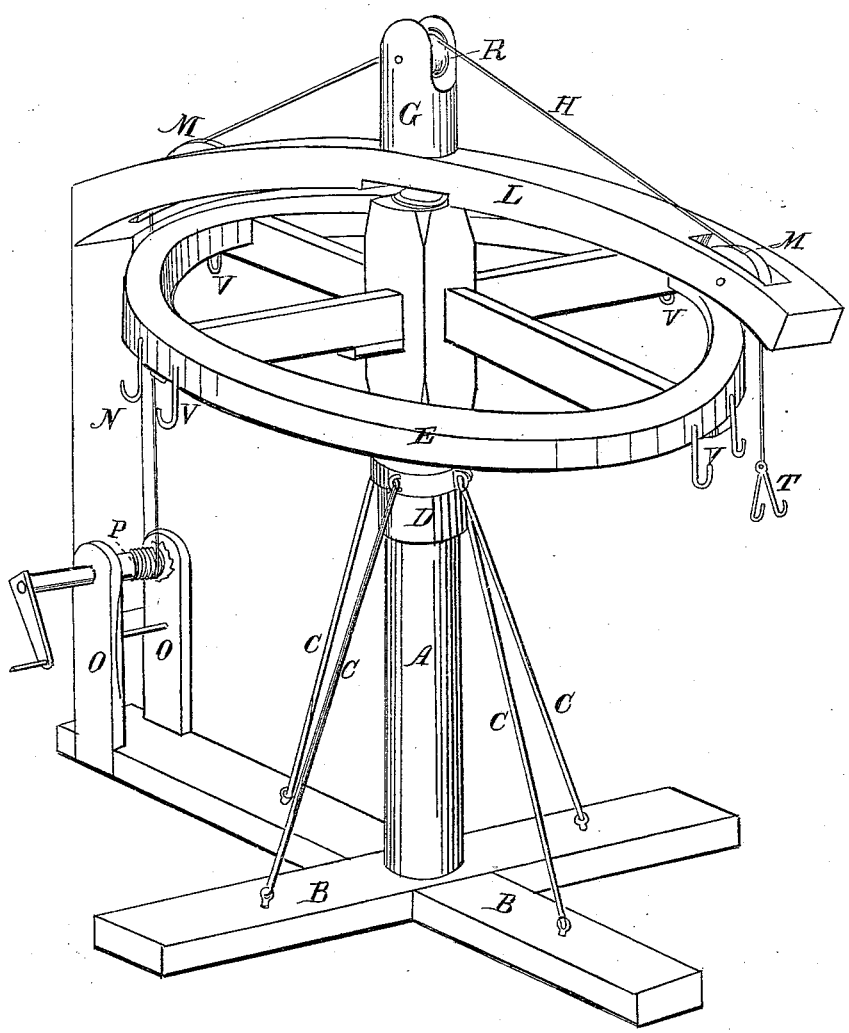

A. J. CHAMBERS AND THOMAS JACKSON, OF NEW WASHINGTON, OHIO.

Letters Patent No. 94,076, dated August 24, 1869.

IMPROVEMENT IN HOG-ELEVATOR.

The Schedule referred to in these Letters Patent and making part of the same.

*To all whom it may concern:*

Be it known that we, A. J. CHAMBERS and THOMAS JACKSON, of New Washington, in the county of Crawford, and in the State of Ohio, have invented new and useful Improvements in Hog-Elevators; and do hereby declare that the following is a full, clear, and exact description thereof, reference being had to the accompanying drawing, and to the letters of reference marked thereon.

The nature of our invention consists in the construction of a device to be applied for elevating weights of all kinds, but to be used more especially by butchers, in hanging up animals after they have been cleaned.

The accompanying drawing represents a perspective view of our invention.

Letter A represents the main upright beam, which rests upon the ground-sills B, placed at right angles to each other, and is braced by the rods C, the upper ends of which are attached to the collar D.

Secured to the beam, near its top, is the large wheel E, provided with hooks upon its periphery, on which the bodies are hung, and which turns freely around with the beam.

In the top of this beam is placed the pulley-block G, which has a pulley placed in its top, over which the rope H passes.

Extending over the wheel, and pivoted on top of the beam, by the tenon on the bottom of the pulley-block, is the arm L, which has a pulley, M, placed in each end. This arm may either be kept in one position, by means of a brace, N, or may be allowed to swing freely around, so that it can be used from any desired point.

Upon one end of one of the sills, there are attached two standards O, upon which the windlass P is placed, being provided with a ratchet and pawl, so that the weight can be secured at any desired height.

To this windlass, one end of the rope H is attached, which passes up over the pulleys M and R, and has a double-pronged hook, T, attached to the opposite end.

To this hook the body or weight is secured, and, after being raised high enough, it is transferred to the hooks V, in the rim of the wheel, when the wheel is swung around so as to bring other hooks in position.

This machine can also be used to weigh the bodies while being raised.

Having thus described our invention,

What we claim, and desire to secure by Letters Patent, is—

1. The beam A, pivoted on the sills B and supported by the collar D and braces C, and having the wheel E secured to its top, in the periphery of which are placed the hooks V, substantially as set forth.

2. The arm L, provided with a pulley at each end, in combination with the pulley-block G, when used substantially as set forth.

3. Wheel E, provided with the hooks V, arm L, pulley-block G, windlass P, provided with a pawl and ratchet, braces C, collar D, ground-sills B, rope H, and hook T, when all are combined to form an elevating-machine, substantially as set forth.

In testimony that we claim the foregoing, we have hereunto set our hands, this 8th day of May, 1869.

A. J. CHAMBERS.
THOMAS JACKSON.

Witnesses:
EMANUEL GUISS,
EPHRAIM BAKER.